US009866554B2

United States Patent
Choi et al.

(10) Patent No.: US 9,866,554 B2
(45) Date of Patent: Jan. 9, 2018

(54) MUTUAL AUTHENTICATION METHOD AND SYSTEM WITH NETWORK IN MACHINE TYPE COMMUNICATION

(71) Applicant: RESEARCH & BUSINESS FOUNDATION SUNGKYUNKWAN UNIVERSITY, Suwon-si (KR)

(72) Inventors: Hyoung Kee Choi, Seoul (KR); Dae Sung Choi, Seoul (KR); Young Jo Kim, Seongnam-si (KR); Ji Young Park, Suwon-si (KR); Dong Hyuk Shin, Gwangju (KR); Joon Woo Yu, Gwacheon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 184 days.

(21) Appl. No.: 14/830,085

(22) Filed: Aug. 19, 2015

(65) Prior Publication Data

US 2016/0323275 A1 Nov. 3, 2016

(30) Foreign Application Priority Data

Apr. 30, 2015 (KR) .................. 10-2015-0061282

(51) Int. Cl.
*H04L 29/06* (2006.01)
*H04W 12/06* (2009.01)
(Continued)

(52) U.S. Cl.
CPC ........ *H04L 63/0869* (2013.01); *H04L 9/0861* (2013.01); *H04L 9/3234* (2013.01);
(Continued)

(58) Field of Classification Search
CPC ........... H04L 9/065; H04L 63/08; H04W 4/08
(Continued)

(56) References Cited

U.S. PATENT DOCUMENTS 8,340,288 B2 * 12/2012 Norrman ............... H04L 9/065
380/44
8,706,085 B2 * 4/2014 Zhang .................. H04L 63/08
455/410
(Continued)

FOREIGN PATENT DOCUMENTS

| JP | 2013-527673 A | 6/2013 |
| KR | 10-2013-0080804 A | 7/2013 |

(Continued)

OTHER PUBLICATIONS

Choi, Daesung, et al, "A group-based security protocol for machine-type communications in LTE-advanced" Wireless Networks, Feb. 2015, vol. 21, Issue 2, pp. 405-419, Aug. 23, 2014.
(Continued)

*Primary Examiner* — Hadi Armouche
*Assistant Examiner* — Bryan Wright
(74) *Attorney, Agent, or Firm* — NSIP Law (57) ABSTRACT

A method for a Mobile Mobility Entity (MME) to carry out mutual authentication with a group of Machine Type Communication (MTC) devices includes receiving group-related authentication data from a leader, transmitting the received information and an identification number of the MME, to a HSS, receiving from the HSS a random value, an Authentication Vector and information of group members, broadcasting the random value and the first authentication token to the MTC device group based on information received from the HSS, receiving from the leader a leader authentication response that the leader generates by using a local master key value calculated by using the first secret key value, authenticating the leader by comparing the leader authentication response with a leader authentication value received from the HSS, and authenticating members within
(Continued)

the MTC device group according to the leader authentication result.

17 Claims, 4 Drawing Sheets

(51) Int. Cl.
*H04W 4/00* (2009.01)
*H04L 9/32* (2006.01)
*H04L 9/08* (2006.01)
*H04L 29/12* (2006.01)
*H04W 12/04* (2009.01)
*H04W 4/08* (2009.01)

(52) U.S. Cl.
CPC ............. *H04L 63/06* (2013.01); *H04W 4/005* (2013.01); *H04W 12/06* (2013.01); *H04L 61/1588* (2013.01); *H04W 4/08* (2013.01); *H04W 12/04* (2013.01)

(58) Field of Classification Search
USPC .......................................................... 713/169
See application file for complete search history.

(56) References Cited

U.S. PATENT DOCUMENTS 8,861,732 B2 * 10/2014 Suh ....................... H04W 12/04
 380/255
9,204,296 B2 * 12/2015 Jones .................... H04W 12/04
2013/0080782 A1 * 3/2013 Rajadurai ............. H04L 63/065
 713/171
2013/0102244 A1 * 4/2013 Oh ........................ H04W 4/005
 455/11.1
2014/0075509 A1 3/2014 Holtmanns et al.
2015/0244720 A1 * 8/2015 Suh ......................... H04W 4/08
 726/4

FOREIGN PATENT DOCUMENTS

KR 10-2014-0030518 A 3/2014
WO WO 2011/127810 A1 10/2011
WO WO 2011/152665 A2 12/2011

OTHER PUBLICATIONS

Dae-Sung Choi et al., "An Group-based Security Protocol for Machine Type Communications in LTE-Advanced." Journal of the Korea Institute of Information Security & Cryptology (JKIISC) vol. 23, No. 5, Oct. 2013 p. 885-896 (13 pages in Korean with English abstract).
Daesung Choi et al., "A Group-based Security Protocol for Machine Type Communications in LTE-Advanced." 2014 IEEE Conference on Computer Communications Workshops (INFOCOM WKSHPS), Apr. 2014 p. 161-162 (2 pages in English).
Korean Office Action dated Jul. 12, 2016 in counterpart Korean Application No. 10-2015-0061282. (6 pages in Korean).
Korean Notice of Allowance issued on Oct. 28, 2016 in counterpart Korean Application No. 10-2015-0061282. (5 pages in Korean).

* cited by examiner

MUTUAL AUTHENTICATION METHOD AND SYSTEM WITH NETWORK IN MACHINE TYPE COMMUNICATION

This application claims the benefit of priority of Korean Patent Application No. 10-2015-0061282 filed on Apr. 30, 2015, which is incorporated by reference in its entirety herein.

BACKGROUND OF THE INVENTION

Field of the Invention

The present invention is related to a mutual authentication method with a network and a system using the method; and more particularly, a method for a group leader to carry out mutual authentication with a network in Machine-Type Communication (MTC) and a system using the method.

Discussion of the Related Art

Machine-to-Machine (M2M) communication enables millions of machines to communicate with devices in the surroundings of the machines through wired or wireless connection. Multitude of new applications within tracking, monitoring, maintenance, and security categories are emerging as M2M communication comes into reality. Similar to M2M communication, the $3^{rd}$ Generation Partnership Project (3GPP) defines the communication between devices and ordinary things which does not involve human intervention as Machine Type Communication (MTC), and standardization for the communication method is being carried out. The 3GPP defines group-based MTC features for the purpose of managing a plurality of MTC terminals in an efficient manner, but backgrounds of and policies for introducing MTC groups are mentioned only briefly without in-depth discussion thereof.

In particular, a method for using delegation-based authentication is one of the methods studied in an attempt to reduce requirements of authentication signaling which cause many problems when MTC communication is performed. In this method, an authentication server authenticates a device by signaling its own authentication signal that can be verified by a serving network. The device does not require other method for accessing the authentication server than receiving the aforementioned authentication signal. However, such a kind of method requires a public key infrastructure and thus suffers a problem since it is not compatible with current secret key systems.

In another method, devices are grouped and serving networks are allowed to have a group leader. A leader, on behalf of all of the MTC devices, authenticates itself to the network. Dynamic Group Based And Key Agreement (DG-BAKA) and Group-based AKA (G-AKA) are two security protocols for authenticating a group of MTC devices. Due to the grouping model, the aforementioned two protocols can reduce communication costs in a network. However, since the two protocols define a procedure for authentication among a group leader and group members in a more or less inefficient manner, the overall complexity of a system is increased as the number of MTC devices becomes large.

EAP-based Group Authentication (EG-AKA) and Secure and Efficient (SE) AKA are group AKA protocols for LTE networks. The overall delay of a current AKA with respect to a single user is large due to a round-trip delay of the authentication server within a core network to and from a backend. To alleviate the delay, the EG-AKA and the SE-AKA have been designed to reduce the number of access to the authentication server. In other words, only the first member within a group is required to perform handshake with the authentication server for authentication. The other members are authenticated by a gateway located close to the authentication server. Since a single group key is shared among group members, a member can overhear private communication of other members. Taking this fact into consideration, these protocols enable forward and backward secrecy of Elliptic Curve Diffie-Hellman (ECDH). However, it should be noted that the protocols above adopt asymmetric key encryption to protect privacy of devices. Therefore, the ECDH and asymmetric encryption may not be appropriate for those MTC devices in a lack of resources.

In other words, the conventional methods are unable to completely solve the problem of congestion and overload in authentication signaling in the LTE or LTE-Advanced (LTE-A) network, and until recently, it was not clear whether signaling traffic among MTC devices had been managed in a productive manner.

SUMMARY OF THE INVENTION

To solve the technical problem above, the present invention has been made in an effort to provide an authentication method and system with a network in MTC and thus to obtain an efficient security protocol so that MTC devices can be grouped and group leaders can perform authentication with the network based on the security protocol.

To achieve the objective above, a method for a Mobile Mobility Entity (MME) to carry out mutual authentication with a group of Machine Type Communication (MTC) devices according to the present invention comprises receiving group-related authentication data from a leader of the MTC device group; transmitting the received information and Serving Network-ID (SN-ID) being an identification number of the MME, to a Home Subscriber Server (HSS); receiving from the HSS i) a random value generated by the HSS and a Local Master Key (LMK) generated based on a first secret key ($SEK_L$) shared between the HSS and the leader beforehand, ii) an Authentication Vector (AV) including a first AUthentication TokeN (AUTN) generated through the local master key information, the random value, and a leader authentication value (XRES), and iii) information of group members ($G_{info}$); broadcasting the random value and the first authentication token to the MTC device group based on information received from the HSS; receiving from the leader a leader authentication response (RES) that the leader generates by using a local master key value calculated by using the first secret key value; authenticating the leader by comparing the leader authentication response with a leader authentication value received from the HSS; and authenticating members within the MTC device group according to the leader authentication result.

The mutual authentication method further comprises delivering an authentication request from the MME to the leader, wherein the group-related authentication data can include International Mobile Subscriber Identity (IMSIn), which is a unique identification number for each of the group members, and International Mobile Group Identity (IMGI), which is a group identification number.

The first authentication token can comprise a value generated by XOR operation between a Sequence Number (SQN) used for preventing re-transmission and the local master key value; and an MME MAC value ($MAC_{MME}$) calculated by applying a third operation to the random value and a group temporary key and a group temporary key is the value obtained by applying a first operation to the group key, the random value and the SN-ID.

Information of the group members can include a Confirmation Value (CV) for verifying a group membership of the MTC device and an expected authentication token (XAUTH) for authenticating individual MTC devices.

The broadcasting the random value and the first authentication token to the MTC device group based on information received from the HSS can comprise the leader's authenticating the MME (wherein verification of the MME is carried out by determining whether the IMGI value received from the MME is identical to a group identifier of the leader and validating a first authentication token for authenticating the MME by verifying the MAC value of the MME and verifying the MME by a member of the MTC device group according to the same manner as used by the leader.

The receiving from the leader a leader authentication response (RES) that the leader generates by using a local master key value calculated by using the first secret key value can comprise the leader's calculating the local master key value, determining whether re-transmission of the authentication vector has been carried out by extracting the SQN value, and the leader's generating the leader authentication response according to the determination result about re-transmission.

The authenticating the leader by comparing the leader authentication response with a leader authentication value received from the HSS can comprise comparing the leader authentication response with a leader authentication value received from the HSS to check whether the two are identical to each other and broadcasting identification information of the leader to the MTC device group members in case they are identical to each other.

The authenticating members within the MTC device group according to the leader authentication result can comprise transmitting, by the member within the MTC device group, following information to the leader, and the information transmitted to the leader can comprise a key value calculated by applying a Key Derivation Function (KDF) to a second secret value ($SEK_i$) shared among individual devices and the HSS and a given Prime Number ($PN_i$); the prime number; a device authentication token ($AUTH_{1,i}$) generated by applying a third function to the prime number and the second secret key; and integrity authentication MAC value ($MAC_{1,i}$) generated by applying a hash function to the key value and the device authentication token by a member within the MTC device group.

Only the information related to a new member from among the information about the four parameters calculated by a member within the MTC device group for authentication can be transmitted to the leader.

The HSS can control to update the key value and the device authentication token by changing the prime number.

The mutual authentication method can further comprise the leader's transmitting to the MME an expected confirmation value (XCV) calculated through Chinese Remainder Theorem (CRT) by using key values received from members within the MTC device group and the prime number; and a member authentication message including an authentication token for confirmation (AUTH) calculated by applying a hash function to device authentication tokens of individual members and the sequence number.

The mutual authentication method can further comprise the MME's authenticating individual members of the MTC device group by comparing an expected confirmation value included in a member authentication message received from the leader with a confirmation value included in the group member information received from the HSS; and by comparing the authentication token for confirmation (AUTH) included in the member authentication message with the expected authentication token (XAUTH) included in the group member information.

The Long Term Evolution (LTE) communication can be used for communication between the leader and the MME and communication between the member and the MME, while short range communication can be used for communication between the leader and members of the MTC group.

To achieve the objective above, a system for Machine Type Communication (MTC) devices to form a group and to carry out mutual authentication with a network according to the present invention can comprise a leader of the MTC device group, members of the MTC device group, a Home Subscriber Server (HSS) generating a random value, generating a Local Master Key (LMK) based on a first secret key value ($SEK_L$) shared by the leader beforehand, and generating information of group members ($G_{info}$) and an authentication vector (AV) including a first authentication token (AUTN), the random value, and the leader authentication value (XRES); and a Mobile Mobility Entity (MME) receiving group-related authentication data from the leader and transmitting the received information and a Serving Network-ID (SN-ID), which is an identification number of the MME, to an HSS, broadcasting the random value and the first authentication token to the MTC device group based on the information received from the HSS, authenticating the leader by receiving from the leader a leader authentication response generated by using a local master key value calculated by the leader by using the first secret value, and authenticating members within the MTC device group according to the leader authentication result.

DETAILED DESCRIPTION OF THE INVENTION

The present invention can be modified in various ways, and various embodiments can be implemented; therefore, particular embodiments are described in detail with reference to accompanying drawings.

This document is not limited to the particular embodiments, but it should be understood that descriptions of this document are applied to all the possible modifications, equivalents, or substitutes which belong to the technical principles and scope of the present invention.

Terms such as first and second can be used for describing various constituting elements but the constituting elements should not be limited by the terms. The terms are introduced only for the purpose of distinguishing one constituting element from the others. For example, a first constituting element may be called a second constituting element without departing from the scope of the present invention and vice versa. Meanwhile, the term of and/or refers to a combination of a plurality of related specific elements or any one of a plurality of related specific elements.

If an element is said to be "linked" or "connected" to a different element, the element may be directly linked or connected to the different element, but a third element may exist to connect the two elements. On the other hand, if an element is said to be "directly linked" or "directly connected" to a different element, it should be understood that no other element lies between the two elements.

Terms used in this document have been introduced only for the purpose of describing particular embodiments but are not intended to limit the present invention. Singular expressions, unless otherwise indicated explicitly, can be used for plural expressions. It should be understood that such terms as "comprise" or "have" in this document are meant to indicate existence of characteristics, numerals, steps, operations, constituting elements, components or a combination thereof, but do not preclude existence or additional possibility of one or more characteristics, numerals, steps, operations, constituting elements, components, or a combination thereof.

Unless otherwise defined, all of the terms used in this document, including technical or scientific ones, carry the same meaning as understood by those skilled in the art to which the present invention belongs. Those terms as defined in an ordinary dictionary should be interpreted to hold the same meaning as contextually indicated by the corresponding technology; therefore, unless otherwise defined explicitly, they should not be interpreted in an ideal manner or in an excessive formality.

In what follows, with reference to appended drawings, preferred embodiments of the present invention will be described in more detail. To facilitate the overall understanding of the present invention, the same reference symbols are used for the same constituting elements used throughout the drawings, and descriptions about the same constituting elements will be omitted.

Figure 1:
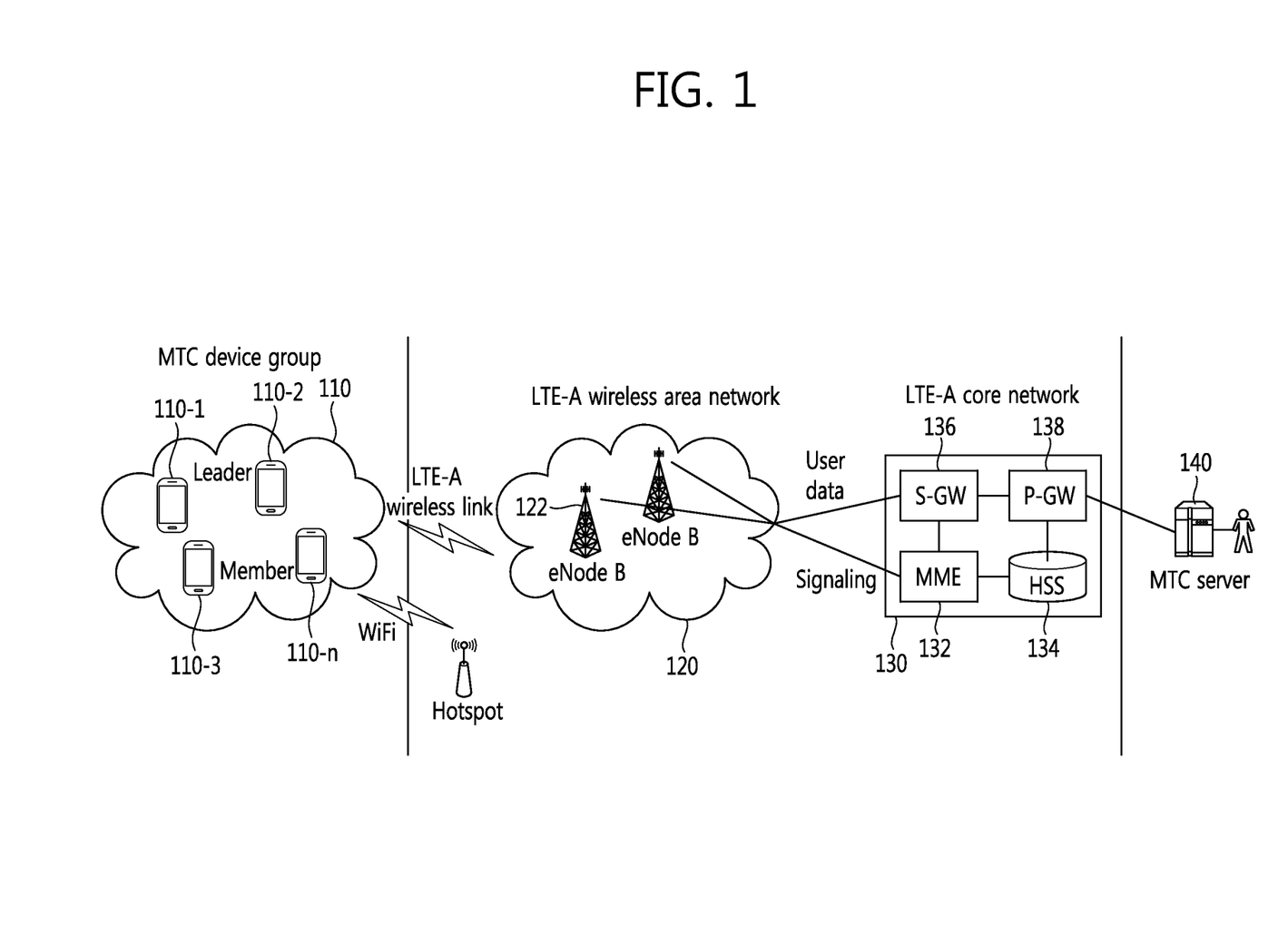
FIG. 1 is a block diagram illustrating the structure of a system to which a mutual authentication method with a network in MTC according to one embodiment of the present invention is applied.

FIG. 1 is a block diagram illustrating the structure of a system to which a mutual authentication method with a network in MTC according to one embodiment of the present invention is applied. As shown in FIG. 1, an MTC mutual authentication system according to one embodiment of the present invention can comprise an MTC device group 110, LTE-A wireless area network 120, LTE-A core network 130, and MTC server 140.

With reference to FIG. 1, the MTC device group 110 can include a plurality of MTC devices 110-1~110-$n$, and the MTC devices 110-1~110-$n$, being attached at devices located at physical positions (for example, gas meters, sensors), can transmit information of the corresponding devices or provide necessary information to the corresponding devices. In addition, MTC devices 110-1~110-$n$ can include a removable Universal Integrated Circuit Card (UICC). UICC can store subscriber information and a few encryption keys with which to access a network.

In the MTC device group 110, an MTC device leader 110-1 and the remaining MTC devices 110-2~110-$n$ exist together. The remaining devices, excluding the MTC device leader 110-1 from the MTC device group 110, are called MTC device members 110-2~110-$n$. The MTC devices 110-1~110-$n$ can be grouped in terms of at least one of position, QoS, and other property. For example, a plurality of MTC devices 110-1~110-$n$ adjacent to a particular area can form a group, while MTC devices 110-1~110-$n$ of a premium class can form a group with respect to QoS.

The MTC device group 110, carrying out authentication with a wireless area network 120, can carry out group-based mutual authentication. The MTC devices 110-1~110-$n$ have International Mobile Group Identities (IMGIs) to identify groups to which they belong. Also, the MTC devices 110-1~110-$n$ have International Mobile Subscriber Identities (IMSIs) for their subscriber identification information. At this time, a master secret key K shared with the authentication server (for example, HSS 134) can be given to the MTC devices 110-1~110-$n$. The IMSI and the secret key K can be stored in a Universal Subscriber Identity Module (USIM). A subscriber, after user authentication is successfully carried out, can get a Global Unique Temporary Identity (GUTI) by the MME 132 according to a security scheme. The GUTI is used as a temporary identifier of the MTC device in a serving network where a perpetual ID of the subscriber is not revealed.

According to an embodiment of the present invention, the wireless area network can be LTE or LTE-A network. The term of LTE and LTE-A can be used interchangeably in this document; LTE-A can be applied for those parts where LTE is applied and vice versa. The LTE wireless network can include eNodeB (eNB) 122. eNB 122 denotes a base station of an EPS network. The wireless are network 120 can relay data received from MTC devices 110-1~110-$n$ to the core network 130.

According to one embodiment of the present invention, devices (including a leader and a member) communicating with the eNB 122 among the MTE device group 110 can transmit and receive data to and from the eNB 122 through an LTE-A wireless link, and devices within the MTC device group 110 can transmit and receive data among the devices by using WiFi communication through hotspots. However, it should be noted that the embodiment above is not limited necessarily to WiFi, but other short range communication methods (such as Bluetooth and ZigBee) can also be used.

The core network 130 can comprise a Mobility Management Entity (MME) 132, Home Subscriber Server (HSS) 134, Serving Gateway (S-GW) 136, and Packet data network Gateway (P-GW) 138. The MME 132 refers to a mobility management entity area, and the HSS 134 is a database containing 3GPP network subscriber information. The MME 132 and the S-GW 136 deal with signaling traffic and user data traffic, respectively. Signaling sent by the MME can be provided to the HSS 134, and the HSS 134 can generate values required to authenticate MTC devices 110-1~110-$n$. The HSS 134 can provide a set of authentication vectors to support the MME 132 to authenticate the MTC devices 110-1~110-$n$. The S-GW 136 can deliver user data to the P-GW 138, and the P-GW 138 can send the user data to an external network. In other words, the MTC devices 110-1~110-$n$ exchange messages with the MME 132 for mutual authentication with the MME 132, and the MME 132 can request group-related data of the MTC devices 110-1~110-$n$ from the HSS 134 for mutual authentication with the MME 132. The HSS 134, in response to the request of the MME 132, can extract group-related data of the MTC devices 110-1~110-$n$, generate relevant information based on the extracted data, and transmit the information to the MME 132.

The MTC server 140 can provide a service for MTC users by processing data transmitted from the MTC devices 110-1~110-$n$. Also, the MTC users (for example, ordinary users, control center, and so on) can transmit data with which the MTC devices 110-1~110-$n$ can be managed.

With respect to security processing, the MTC devices 110-1~110-n carry out a Non-Access Stratum (NAS) security process with the MME 132 and carry out an Access Stratum (AS) security process with the eNB 122.

Figure 2:
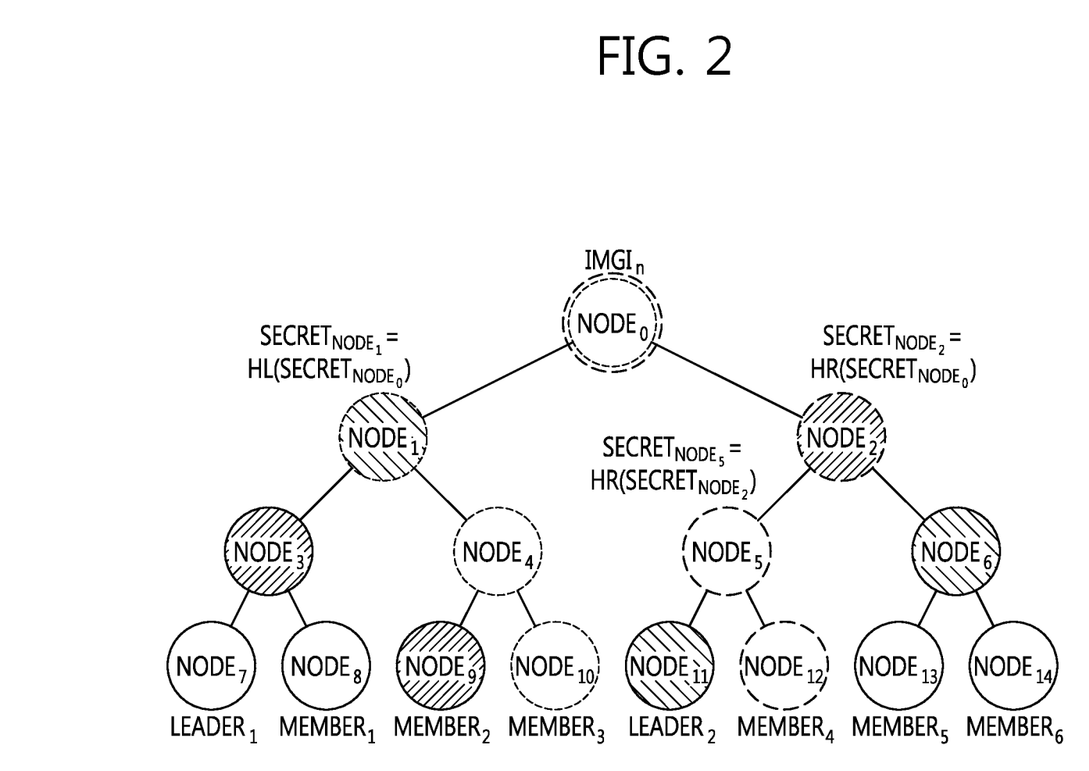
FIG. 2 is a conceptual drawing illustrating how group management of MTC devices is carried out by using a binary tree.

FIG. 2 is a conceptual drawing illustrating how group management of MTC devices is carried out by using a binary tree.

With reference to FIG. 2, a group leader and terminals in the surroundings of the group leader form a group and share one group key. A secret key for group members is generated as follows. At this time, a secret key is used for updating a group key or generating a session key.

For managing and sharing secret keys, the HSS in the LTE network generates a binary tree having leaf nodes more than the number of group members n. The group ID (IMGI) that the HSS generates is assigned to the root node of FIG. 2, $NODE_0$, and each individual node generates its own secret key value from its parent node. Child nodes in the left side generate secret values by applying HL to their parent nodes (HL and HR denote different hash functions), and child nodes in the right side generate secret values by applying HR to their parent nodes. Terminals registered as group members are assigned to leaf nodes and obtain secret values except for Restricted Secret (RS) values. RS values refer to those values assigned to a leaf node and its parent nodes tracking all the way back to the root node. For example, the secret values of $MEMBER_3$ can have any secret values excluding $SECRET_{NODE0}$, $SECRET_{NODE1}$, $SECRET_{NODE4}$, and $SECRET_{NODE10}$.

The secret values of $MEMBER_3$ can be any secret value except for $SECRET_{NODE0}$, $SECRET_{NODE1}$, $SECRET_{NODE4}$, and $SECRET_{NODE10}$. In other words, the secret value of $MEMBER_3$ is one of $\{SECRET_{NODE2}$, $SECRET_{NODE3}$, $SECRET_{NODE5}$, $SECRET_{NODE6}$, $SECRET_{NODE7}$, $SECRET_{NODE8}$, $SECRET_{NODE9}$, $SECRET_{NODE11}$, $SECRET_{NODE12}$, $SECRET_{NODE13}$, $SECRET_{NODE14}\}$. However, since $SECRET_{NODE7}$ can be obtained by applying HL to $SECRET_{NODE3}$, it is no necessary to store all of the secret values. Those values that can be derived may not be stored, while only those values that cannot be derived may be stored. In this sense, secret values may be obtained as described in the previous example, but actual values that are stored can be $\{SECRET_{NODE3}$, $SECRET_{NODE2}$, $SECRET_{NODE9}\}$. Secret values that are not stored can be derived by applying HR or HL to the secret values stored.

While generating a tree, the HSS can generate a group key (GK). Furthermore, a service provider stores a set of parameters within security storage of an MTC device at the time of registration. These parameters can include IMGI, GK, $PN_i$, $SEK_i$, secret values of a device, and hash functions. At this time, a group is identified by IMGI, $PN_i$ is a prime number that the HSS generates, and $SEK_i$ is a secret key that the HSS generates, where the parameters can be shared between the HSS and the device (device).

A leader can be assigned to one of MTC devices in the same group to represent the corresponding group to a core network. A leader can be registered in the HSS and identified by IMSI. A leader itself is an MTC device, occupying a place within the binary tree and can store the same parameters as a member.

The following illustrate an operation of adding and removing a group member.

When a new member is added, a group key needs be updated to ensure the secret of a previous message. The HSS assigns the new member to an empty leaf node and informs group members of this assignment to have the group key updated. The group key is updated by applying a hash function to the XOR value of an existing group key and the secret key of a node to which the new member has been added. For example, if $MEMBER_3$ is added, the new group key becomes $GK=H(GK \oplus SECRET_{NODE10})$.

In case an existing member leaves the group, all of the group members are informed of the leave, and the group key is updated so that the leaving member cannot open incoming messages. A method for updating a group key is the same one as used for adding a new member. In case $MEMBER_3$ leaves the group, the new group key becomes $GK=H(GK \oplus SECRET_{NODE10})$. Since the secret key of $MEMBER_3$ does not have $SECRET_{NODE10}$, MEMBER3 is unable to know the new group key. Therefore, forward secrecy and backward secrecy can be ensured.

In what follows, a method for generating a session key is described.

A session key is generated when the MME and a member within the group communicates with each other. A session key is generated by XORing and hashing a secret value common to the two members trying to communicate with each other. If two members at $Node_{10}$ and $Node_{12}$ attempt to communicate with each other, secret values of $Node_3$, $Node_6$, $Node_9$, and $Node_{11}$ common to the two nodes are XORed. In other words, $SK_{10,12}=H((SECRET_{NODE3} \oplus SECRET_{NODE6} \oplus SECRET_{NODE9} \oplus SECRET_{NODE11})$ ∥RAND). Except for the two members involved in communication, there are no other members aware of the secret value used for the session key; thus, the session key can be used as a secret key between the two members.

Figure 3:
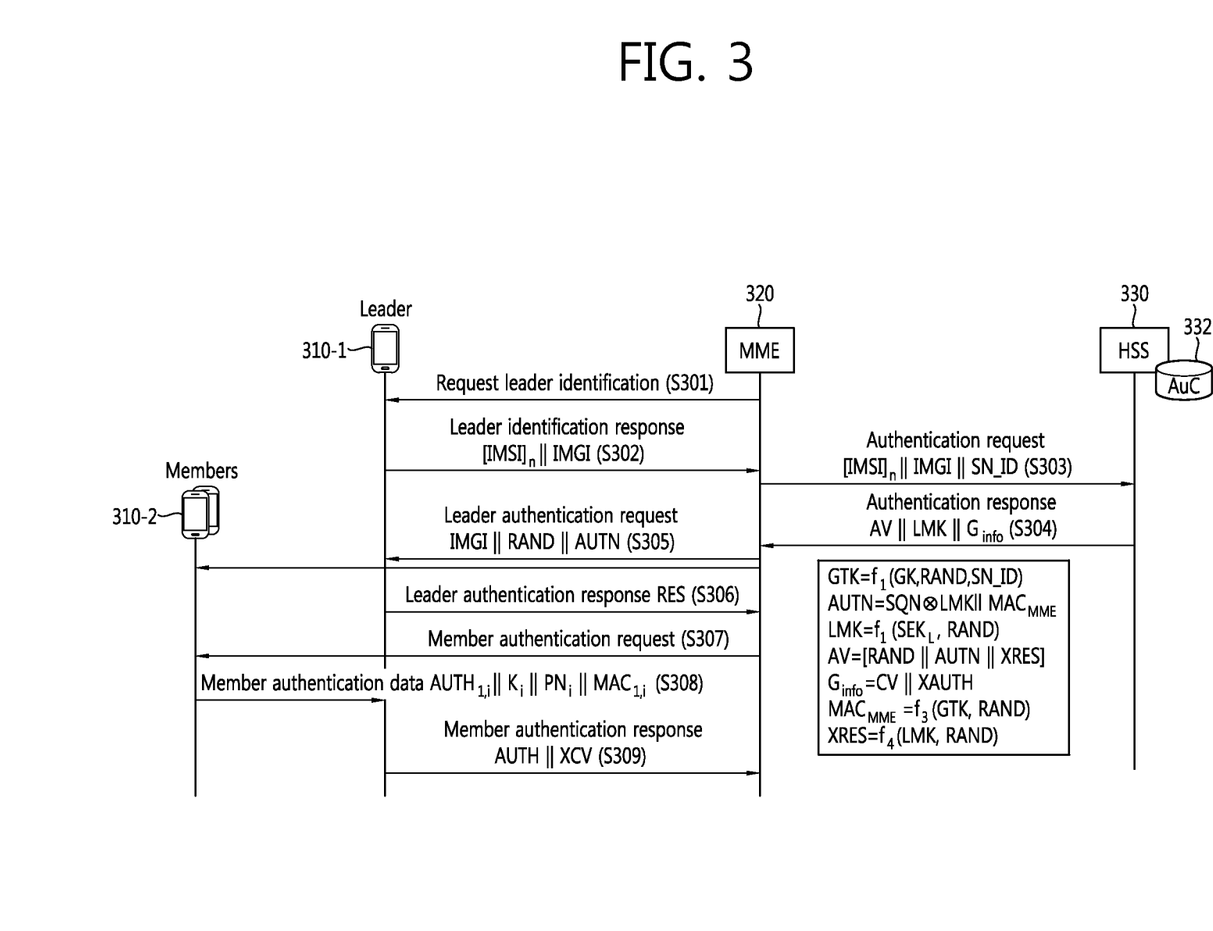
FIG. 3 is a flow diagram illustrating a process of authentication and key approval between a leader and a core network according to one embodiment of the present invention.

FIG. 3 is a flow diagram illustrating a process of authentication and key approval between a leader and a core network according to one embodiment of the present invention.

Authentication and approval of a session key may be carried out first between the leader chosen 310-1 and the core network. As a result, a security link can be generated within the E-UTRAN. Then all of the group members 310-2 can be authenticated to the core network through the security link by using a WiFi secondary link and the leader as an instrument.

In order to prevent collision due to simultaneous multiple initialization, leaders are ordered to wait for a random time period before they send initial messages. In other words, if the leader of a particular group overhears the initial message sent by the leader of another group, it has to wait until a series of processes are completed.

With reference to FIG. 3, first of all, the MME 320 can request the MTC leader 310-1 to identify MTC devices S301. The leader 310-1, including its own $[IMSI_i]_n$, can respond to the MME 320 by using IMSIs of group members and group ID (IMGI) S302.

The MME 320, receiving a response from the leader 310-1, incorporates its own ID, SN_ID, into the response and transmits an authentication request to the HSS 330 through a security channel S303. At this time, it can be assumed that the channel is safe due to IP security. The HSS 330 can calculate a Group Temporary Key (GTK) from Group Key (GK), RAND, and SN_ID by using the relationship that $GTK=f_1(GK, RAND, SN\_ID)$. At this time, RAND is a random value generated by the HSS 330. The HSS 330 can approve identification of the leader 310-1 and confirm group members 310-2 associated with the IMGI.

Next, the HSS 330 can confirm legitimacy of the MME 320 by checking validity of SN_ID. Then the HSS 330 can calculate three parameters of Authentication Vector (AV), Local Master Key (LMK), and $G_{info}$. And the HSS 330 can transmit the three parameter values to the MME 320, S304.

The LMK can be derived from the secret key $SEK_L$ shared between the leader 310-1 and the HSS 330 by using the relationship that LMK=$f_2$($SEK_L$, RAND). The LMK can be used to derive NAS and AS keys.

The AV can include three parameters of RAND, XRES, and AUTN. The parameter XRES is a leader authentication value, which is a response expected from a device involved in authentication. The AUTN (AUthentication TokeN) can include a sequence number SQN encrypted together with a message authentication code ($MAC_{MME}$) and the LMK. The sequence number is used to prevent the authentication vector from being used repeatedly. The message authentication code can be derived by using the relationship that $MAC_{MME}$=$f_3$(GTK, RAND). The group information $G_{info}$ can include two parameters of Confirm Variable (CV) and expected authentication token (XAUTH). The MME 320 can use the Confirmation Value (CV) to verify the group membership of the MTC devices 310-1, 310-2 and use XAUTH to authenticate individual devices.

When processing in the HSS 330 is completed, the MME 320 can transmit a leader identification request message to the leader 310-1 and the members 310-2 by using the broadcast channel in the LTE downlink based on the information received from the HSS 330, S305. At this time, the message can include IMGI, RAND, and AUTH. Afterwards, the leader 310-1 can check whether the IMGI corresponds to its group ID and validate the AUTN for authenticating the MME 320 by verifying $MAC_{MME}$. The members 310-2 perform the same process to verify the MME 320.

Now, the leader 310-1 calculates the local master key and extracts an SQN value to know in which way the authentication vector has been re-used. And the leader 310-1 prepares a leader authentication response (RES) and transmits the RES to the MME 320, S306. Next, NAS security is established between the leader 310-1 and the MME 320 for communication security.

The MME 320, which has received the RES, checks whether the RES is identical to the XRES (leader authentication value) received from the HSS 330 to authenticate the leader 310-1. Then the MME 320 broadcasts a member authentication request to all of the devices 310-2 within the group S307.

The MTC device member 310-2 calculates a key value $K_i$ and authentication value $AUTH_{1,i}$ separately. At this time, $K_i$=KDF($PN_i \oplus SEK_i$) (where KDF denotes Key Derivation Function) and $AUTH_{1,i}$=$f_3$($SEK_i$, $PN_i$) can be used. And a message authentication code is calculated by using $MAC_{1,i}$=H($K_i$, $AUTH_{1,i}$). The message authentication code may be intended for integrity verification. At this time, $SEK_i$ is a secret key shared by each device and the HSS 330, and $PN_i$ is a given prime number. In case the leader 310-1 is found not to have the four parameters of $K_i$, $PN_i$, $AUTH_{1,i}$, and $MAC_{1,i}$, the device can transmit the four parameters to the leader 310-1, S308. These four parameters may remain the same throughout the whole authentication rounds. Accordingly, traffic congestion toward the leader 310-1 can be prevented. However, in the case of security concerns, the HSS 330 can change $K_i$ and $AUTH_{1,i}$ by replacing the $PN_i$ value to update the four parameters of the MTC device member 310-2. The message authentication code $MAC_{1,i}$ supports the leader 310-1 to authenticate a message. The MTC device member 310-2 encrypts the message by using a session key and transmits data including the four parameters to the leader 310-1 within a secondary channel through a Wi-Fi hotspot.

The leader 310-1 calculates a value used for calculating an Expected Confirmation Value (XCV') by applying Chinese Remainder Theorem (CRT) based on $K_i$ and PNi. The expected confirmation value can be calculated by using the relationship that XCV'=$K_1$ mod $PN_1$= . . . =$K_k$ mod $PN_k$ and XCV=XCV'$\oplus$SQN. The leader 310-1 can prepare AUTH used as an authentication token of each member by using the relationship that AUTH=H($AUTH_{1,i} \oplus$ . . . $\oplus AUTH_{1,n} \oplus$ SQN). And the leader 310-1 can carry out authentication of a current member by using the AUTH value and transmit the authentication result to the MME 320, S309. The authentication message can include XCV and AUTH. To verify the members 310-2 belonging to the same group, the MME 320 can compare the Confirmation Value (CV) received from the HSS 330 with an Expected Confirmation Value (XCV) received from the leader 310-1. Also, the MME 320 can authenticate each member 310-2 by comparing an authentication token (AUTH) with an expected authentication token (XAUTH) received from the HSS 330.

Figure 4:
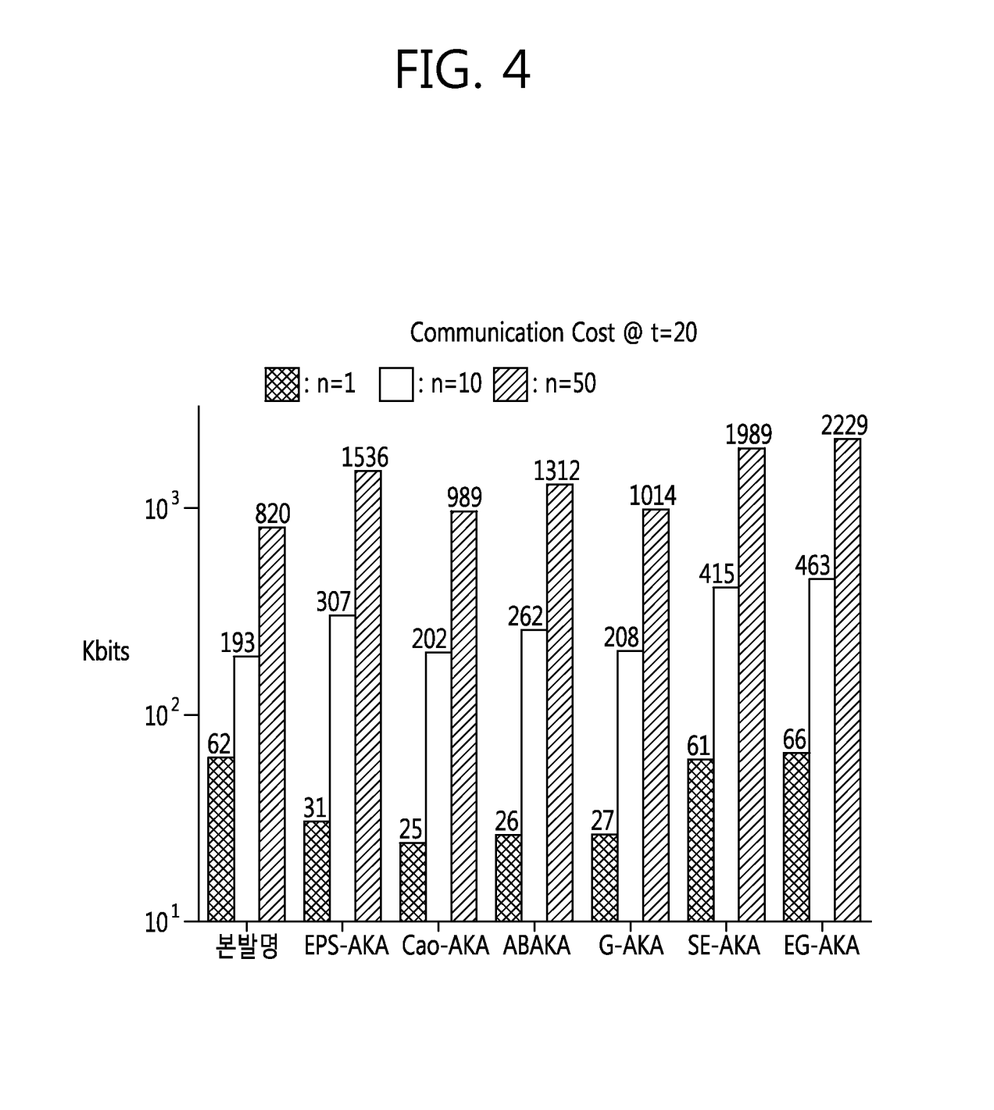
FIG. 4 is a graph showing performance comparison in terms of communication costs between an MTC network authentication method according to one embodiment of the present invention and other AKAs.

FIG. 4 is a graph showing performance comparison in terms of communication costs between an MTC network authentication method according to one embodiment of the present invention and other AKAs.

With reference to FIG. 4, the number of repetition is set to 20 (t=20), and communication costs of the existing six AKAs are compared with each other when n=1, n=5, and n=20 (where n is the number of MTC devices). It can be shown from the figure that communication costs incurred when the method of the present invention is applied require smaller bandwidth as the number of devices becomes large due to the advantage of grouped requests.

The present invention has been described with reference to accompanying drawings and embodiments; however, the technical scope of the present invention is not limited to what is defined by the drawings or embodiments, and it should be understood by those skilled in the art that the present invention can be modified or revised in various ways without departing from the technical principles and scope of the present invention defined by the appended claims.

A mutual authentication method with a network in an MTC and a system using the method according to the present invention can not only reduce authentication signaling generated between MTC devices and the LTE-A network but also manage MTC devices in an efficient manner.

What is claimed is:

1. A method for a Mobile Mobility Entity (MME) to carry out mutual authentication with a Machine Type Communication (MTC) device group, the method comprising:

receiving group-related authentication data from a leader of the MTC device group;

transmitting the received group-related authentication data and a Serving Network-ID (SN-ID) to a Home Subscriber Server (HSS), the SN-ID being an identification number of the MME;

receiving, from the HSS, a local master key generated based on a random value generated by the HSS and a first secret key shared between the HSS and the leader beforehand, an authentication vector including a first authentication token generated based on the local master key, the random value, and a leader authentication value;

broadcasting the received random value and the received first authentication token to the leader and the members of the MTC device group;

receiving, from the leader, a leader authentication response that the leader generates by using the local master key calculated by using the first secret key value;

authenticating the leader by comparing the leader authentication response with the leader authentication value received from the HSS;
authenticating the members of the MTC device group based on a member authentication response received from the leader, wherein
the member authentication response is based on member authentication data received from the members of the MTC device group.

2. The method of claim 1, further comprising delivering an authentication request from the MME to the leader, wherein the group-related authentication data includes an International Mobile Subscriber Identity (IMSI), which is a unique identification number for each member of the MTC device group, and an International Mobile Group Identity (IMGI), which is a group identification number.

3. The method of claim 2, wherein the received first authentication token comprises:
a value generated by XOR operation between a Sequence Number (SQN) of encryption and the local master key value; and
a value of message authentication code (MAC) for the MME calculated by applying a third operation to the random value and a group temporary key,
wherein the group temporary key is the value obtained by applying a first operation to the group key, the random value and the SN-ID.

4. The method of claim 1, further comprising receiving information of members of the MTC device group along with the local master key and the authentication vector, wherein the information of members of the MTC device group includes a corresponding Confirmation Value (CV) for verifying a group membership of a respective MTC device and a corresponding expected authentication token (XAUTH) for authenticating the respective MTC device.

5. The method of claim 3, wherein the broadcasting of the received random value and the received first authentication token to the leader and the members of the MTC device group further comprises:
verifying, by the leader, the MME by determining whether a value of the IMGI received from the MME is identical to a group identifier of the leader and validating the received first authentication token based on a verification of the value of the MAC for MME; and
verifying, by the members of the MTC device group, the MME by determining whether the value of the IMGI received from the MME is identical to the group identifier of the leader and validating the received first authentication token based on the verification of the value of the MAC for MME.

6. The method of claim 1, wherein the receiving, from the leader, of the leader authentication response further comprises:
calculating, by the leader, the local master key;
determining whether re-transmission of the authentication vector has been carried out by extracting the SQN value; and
generating, by the leader, the leader authentication response according to a result of the determination about re-transmission.

7. The method of claim 1, wherein the authenticating of the leader by comparing the leader authentication response with the leader authentication value received from the HSS comprises:
determining whether the leader authentication response and the leader authentication value are identical to each other; and
broadcasting identification information of the leader to the members of the MTC device group in response to the leader authentication response and the leader authentication value being identical to each other.

8. The method of claim 1, wherein the authenticating of the members of the MTC device group further comprises:
transmitting, by the members of the MTC device group, following information to the leader, the information transmitted to the leader comprising:
a key value calculated by applying a Key Derivation Function (KDF) to a second secret value shared among individual devices and the HSS and a given Prime Number ($PN_i$);
the prime number;
a device authentication token ($AUTH_{1,i}$) generated by applying a third function to the prime number and the second secret key; and
integrity authentication MAC value ($MAC_{1,i}$) generated by applying a hash function to the key value and the device authentication token by a corresponding member of the MTC device group.

9. The method of claim 8, wherein only a pan of the information related to a new member of the MTC device group is transmitted to the leader.

10. The method of claim 8, wherein the HSS controls an updating of the key value and the device authentication token by changing the prime number.

11. A method for a Mobile Mobility Entity (MME) to carry out mutual authentication with a Machine Type Communication (MTC) device group comprising:
receiving group-related authentication data from a leader of the MTC device group;
transmitting the received information and Serving Network-ID (SN-ID) being an identification number of the MME to a Home Subscriber Server (HSS);
receiving from the HSS, a Local Master Key (LMK) generated based on a random value generated by the HSS and a first secret key ($SEK_L$) shared between the HSS and the leader beforehand, an Authentication Vector (AV) including a first AUthentication TokeN (AUTN) generated through the local master key information, the random value, and a leader authentication value (XRES)
broadcasting the random value and the first authentication token to the MTC device group based on information received from the HSS;
receiving from the leader a leader authentication response (RES) that the leader generates by using a local master key value calculated by using the first secret key value;
authenticating the leader by comparing the leader authentication response with a leader authentication value received from the HSS; and
authenticating members within the MTC device group according to the leader authentication result, wherein
the authenticating member within the MTC device group according to the leader authentication result comprises:
transmitting, by the member within the MTC device group, following information to the leader, the information transmitted to the leader comprising:
a key value calculated by applying a Key Derivation Function (KDF) to a second secret value ($SEK_i$) shared among individual devices and the HSS and a given Prime Number ($PN_i$);
the prime number;

a device authentication token ($AUTH_{1,i}$) generated by applying a third function to the prime number and the second secret key; and integrity authentication MAC value ($MAC_{1,i}$) generated by applying a hash function to the key value and the device authentication token by a member within the MTC device group, and the leader transmits, to the MME, an expected confirmation value (XCV) calculated through Chinese Remainder Theorem (CRT) by using key values received from members within the MTC device group and the prime number; and a member authentication message including an authentication token for confirmation (AUTH) calculated by applying a hash function to the sequence number and device authentication tokens of individual members.

12. The method of claim 11, further comprising:
authenticating individual members of the MTC device group by comparing an expected confirmation value included in a member authentication message received from the leader with a confirmation value included in the group member information received from the HSS; and by comparing the authentication token for confirmation (AUTH) included in the member authentication message with the expected authentication token (XAUTH) included in the group member information.

13. The method of claim 1, wherein Long Term Evolution (LTE) communication is used for communication between the leader and the MME, while short range communication is used for communication between the leader and the members of the MTC device group.

14. A mutual authentication system for Machine Type Communication (MTC) devices to form a MTC device group and to carry out mutual authentication with a network, the mutual authentication system comprising:
a leader of the MTC device group;
members of the MTC device group;
a Home Subscriber Server (HSS) configured to:
  generate a random value,
  generate a local master key based on a first secret key value shared by the leader beforehand, and
  generate information of members of the MTC device group and an authentication vector including a first authentication token generated based on the local master key information, the random value, and a leader authentication value; and a Mobile Mobility Entity (MME) configured to:
  receive group-related authentication data from the leader,
  transmit the received group-related authentication data and a Serving Network-ID (SN-ID), which is an identification number of the MME, to the HSS,
  broadcast the random value and the first authentication token to the leader and the members of the MTC device group,
  receive, from the leader, a leader authentication response generated by the leader by using the local master key value calculated by using the first secret value,
  authenticate the leader by comparing the leader authentication response with a leader authentication value received from the HSS,
  authenticate the members of the MTC device group based on a member authentication response received from the leader, wherein
  the member authentication response is based on member authentication data received from the members of the MTC device group.

15. The method of claim 1, wherein the authenticating of the members of the MTC device group further comprises:
broadcasting a member authentication request to the leader and the members of the MTC device group.

16. The method of claim 15, further comprising:
receiving, from the leader, an expected confirmation value (XCV) calculated through Chinese Remainder Theorem (CRT) by using key values received from the members of the MTC device group and the prime number and the member authentication response including an authentication token for confirmation (AUTH) calculated by applying a hash function to the sequence number and the device authentication tokens of individual members of the MTC device group.

17. The method of claim 16, further comprising:
authenticating the members of the MTC device group by comparing an expected confirmation value included in the member authentication response received from the leader with a confirmation value received from the HSS; and by comparing the authentication token for confirmation (AUTH) included in the member authentication response with the expected authentication token (XAUTH) received from the HSS.

* * * * *